United States Patent
Kok

(10) Patent No.: US 7,339,349 B2
(45) Date of Patent: Mar. 4, 2008

(54) BATTERY REPLACEMENT MECHANISM FOR MOBILE DEVICE

(75) Inventor: Yeoh Sian Kok, Sungai Petani (MY)

(73) Assignee: Dallab Inc SDN BHD, Penang (MY)

( * ) Notice: Subject to any disclaimer, the term of this patent is extended or adjusted under 35 U.S.C. 154(b) by 379 days.

(21) Appl. No.: 11/054,457

(22) Filed: Feb. 9, 2005

(65) Prior Publication Data

US 2006/0176016 A1  Aug. 10, 2006

(51) Int. Cl.
*H02J 7/00* (2006.01)

(52) U.S. Cl. ............... 320/110; 320/114; 439/500; 455/351; 429/96; 361/434; 361/500; 361/600

(58) Field of Classification Search ......... 320/110, 320/114; 439/500; 455/351; 429/96; 361/434, 361/500, 600
See application file for complete search history.

(56) References Cited

U.S. PATENT DOCUMENTS 5,369,802 A * 11/1994 Murray ............... 455/351
5,863,218 A * 1/1999 Quat et al. ............ 439/500
6,060,193 A   5/2000 Remes et al.
6,294,286 B1 * 9/2001 Gosior et al. ......... 429/96
6,722,024 B2 * 4/2004 Chow ................. 429/96
6,936,376 B2 * 8/2005 Plumadore ............ 429/96
2003/0003949 A1   1/2003 Park

FOREIGN PATENT DOCUMENTS

EP   1 102 411   5/2001

* cited by examiner

*Primary Examiner*—Bao Q. Vu
*Assistant Examiner*—Jue Zhang
(74) *Attorney, Agent, or Firm*—Warner Norcross & Judd LLP

(57) ABSTRACT

A mobile device including a battery mechanism that maintains power to the device when an old battery is replaced by a new battery. The device includes at least first and second pins that engage selected recesses defined by the old battery to control mechanically the movement of the old battery at the time of its replacement with a new battery, and accordingly to prevent power interruption to the device, as the old battery is replaced. A method of replacing batteries of a mobile device without interrupting power to the device is also provided.

19 Claims, 5 Drawing Sheets

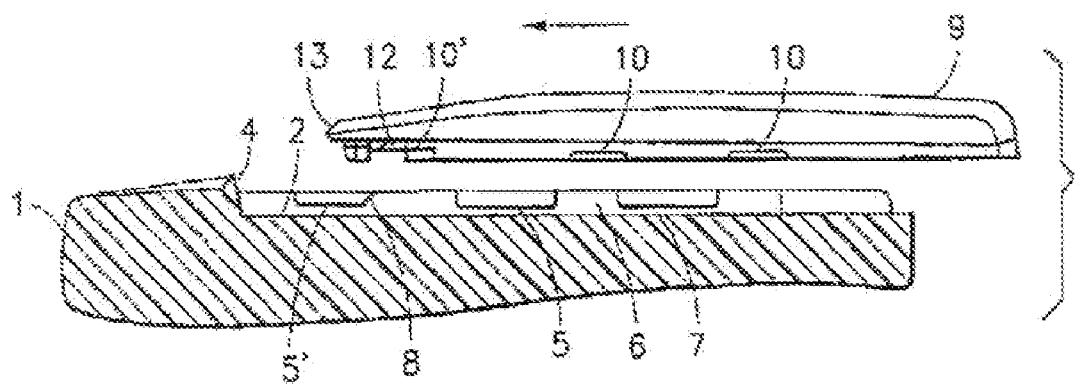
Fig. 1A (Prior Art)
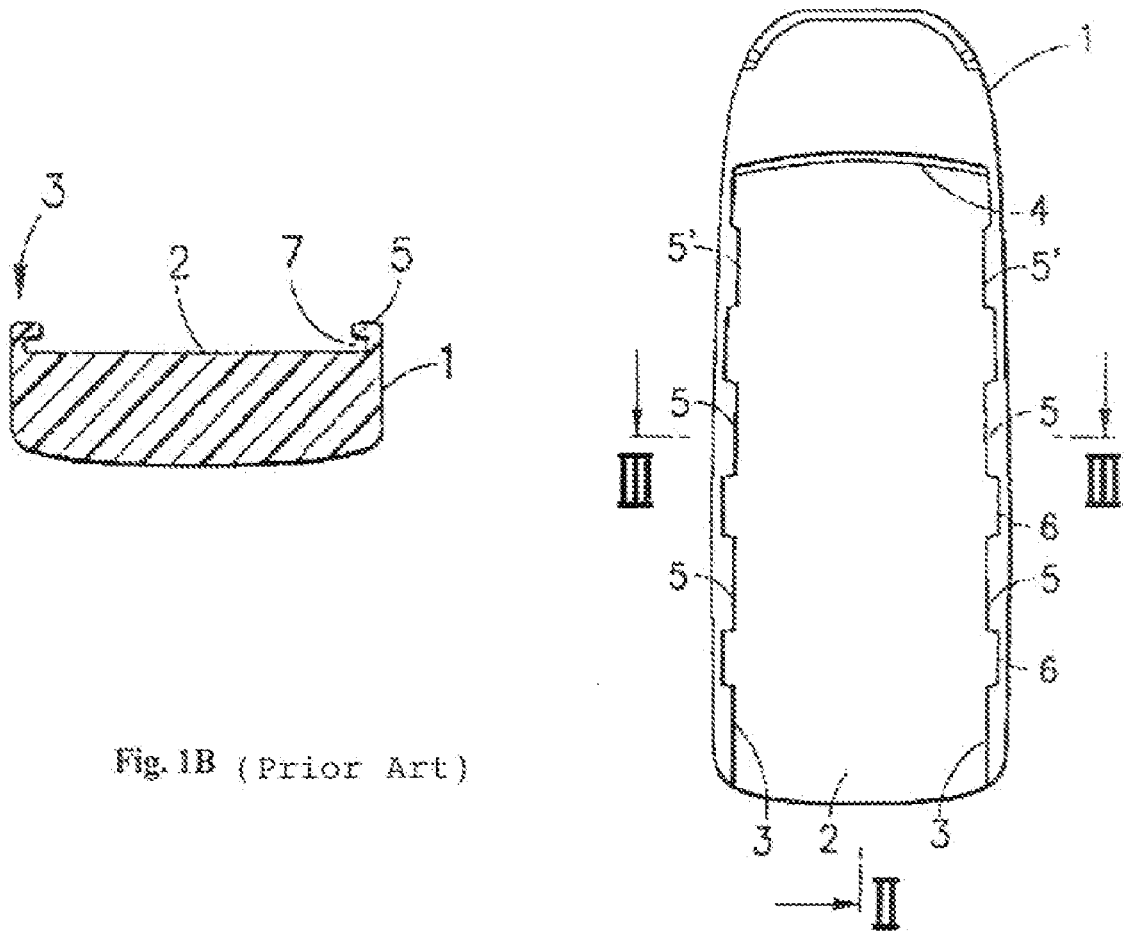
Fig. 1B (Prior Art)
Fig. 1C (Prior Art)

BATTERY REPLACEMENT MECHANISM FOR MOBILE DEVICE

FIELD OF INVENTION

The present invention relates to an improved pocket personal computer (PC) with hand mobile phone, and more particularly to an improved PDA (personal digital assistant) device, that provides continuous flow of power during the replacement of battery. I.e., no shut down is required if old battery is replaced by a new one so that conversation and/or downloading can be continued without interruption.

BACKGROUND OF THE INVENTION

Most existing PDA devices and/or pocket PCs with hand phone/mobile phone device have a phone body and a detachable rechargeable battery pack for supplying power to the phone body. In a conventional PDA/mobile phone, when the battery charge is low or the battery dies, replacement of the battery requires shutting down the device. The battery is removed and a new battery is placed herein. The process may involve disruption of conversation or disruption of downloading process from Internet to the said device. Alternatively, the device may be plugged into a power source so as to charge the battery.

The user can switch video modes on Pocket PC just like a Windows® desktop. At work or at home, the user can use the Pocket PC remote control component to work with a PDA using a keyboard or mouse, which is more efficient and convenient.

Related art will be explained with reference to FIGS. 1, 1A, 1B, 1C and 1D. U.S. Pat. No. 6,060,193 dated May 9, 2000, and issued to Timo Remes, Salo et al, shows an attachment of a mobile phone battery. FIG. 1A depicts the fitting into place of the battery by pushing the battery into the recess in the casing of the phone. FIG. 1B shows a cross section of the casing, III-III, from FIG. 1C, FIG. 1C shows the casing of a mobile phone from the bottom side with the recess in it for a battery.

FIG. 1D shows the locking between the catch incorporated in the recess and the locking element of the battery. The battery 9 is pushed in the horizontal direction, for example in the direction of the surface of the phone, into a recess 2 formed in the casing 1 of the phone. The shallow recess 2 comprises the longitudinal sides 3 of the casing 1 as well as a lateral end 4, which is arranged to come up against the end of the battery that is pushed into place. On both sides 3 of the recess 2, thee are tabs 5, 5' which are positioned symmetrically in the direction of the phone's bottom surface and between which there remain spaces 6 and beneath which there are grooves 7 to receive the tabs on the sides of the battery.

The tabs nearest to the end 4 of the recess have bevels 8 which are oriented towards the direction from which the battery is pushed into place. The sides of the battery 9 are equipped with tabs 10, 10'. Battery 9 slides under the tabs 5, 5' of the tabs on the sides of the recess 2 so as to hold the battery in place in the vertical direction. Holding of the battery 9 in place in the horizontal direction is arranged with at least one locking element 12, which is located on the side of the battery and locks, when viewed inthe direction of pushing, behind the tab 5' on the side of the recess in such a fashion that the tab 5' functions as an element that holds the battery in place simultaneously in both the horizontal and vertical direction. The locking element 12 is located with a spring which, when pushed, releases the battery, enabling it to be removed. The battery 9 is equipped with a spring-loaded locking piece 11. The locking piece 11 is positioned near the tip 13 of the battery. By pressing a push button of locking piece 11 against the spring 14, the locking element 12 can nevertheless be brought to the same level as the tabs 10' on the sides of the battery.

U.S. Patent Publications No. 2003/0003949 A1 dated Jan. 2, 2003 of Jun Won Park deals with a mobile phone in which a battery pack can be removed easily. EP 1,102,411 A2 relates to a battery pack for a mobile phone.

To solve the above problem, an improved PDA device/pocket PC with hand phone/mobile phone has been devised that does not require shut down of the device when the power of the battery gets low. Continuity of conversation and/or continuity of the data connection can be maintained without interruption.

An improved pocket PC or PDA with an improved mechanism for facilitating battery swapping is thus highly desirable.

SUMMARY OF THE INVENTION

Accordingly, the present invention is directed to an improved PDA device/pocket PC with hand phone/mobile phone that substantially obviates one or more limitations and disadvantages of the prior devices.

An object of the present invention is to provide an improved PDA device/pocket PC with hand phone/mobile phone device that does not require the user to shut down the device when the battery phone is low or when the device needs a new battery, thereby ensuring no interruption in continuity of conversation and/or data connection.

Another object of the present invention is to provide an improved PDA device/pocket PC that permits the user to slidably replace the old battery with a new one, thereby ensuring uninterrupted flow of power to the device from the new battery.

A further object of the present invention is to provide the device with a battery swapping mechanism to mechanically control the movement of the old battery during its replacement.

Still another object of the present invention is a battery that is compatible with the battery swapping mechanism of the device, thereby achieving the above objects.

In one embodiment, the device comprises at least one pin having an angled face and extending from a lever located opposite the screen, i.e., at the back side of the main body of the device.

The present invention also shows a method of swapping in a new battery pack into the recess meant for the said battery pack.

In another embodiment, a method is provided for replacing a battery on the device while maintaining power to the device. The method can include moving an old battery from a first position by pushing the old battery with a new battery relative to the device. The new battery moves into the first position, wherein terminal switches of the device remain in contact with metallic strips on at least one of the old battery and the new battery during the battery swap to provide uninterrupted power to the device.

Optionally, the device can include an element such as a lever to which a first and second pin is joined. The first pin can be adapted to engage first and second slots defined by the battery. Further optionally, when the old battery is moved with the new battery, the lever, and thus the first pin, moves, and the first pin disengages the first slot until moved a distance, wherein the first pin engages the second slot to prevent further movement of the old battery. As the new battery continues to move the old battery, the new battery engages the second pin, moves the lever, and subsequently disengages the first pin from the second slot of the old battery, enabling the old battery to be fully replaced with the new battery while maintaining uninterrupted power to the device.

Additional features and advantages of the invention will be set forth in the description which follows, and in part will be apparent from the description, or may be learned by practice of the present invention. The objectives and other advantages of the invention will be realized and attained by the structure particularly pointed out in description and claims thereof as well as appended drawings.

To achieve these and other advantages and in accordance with the purpose of the present invention, as embodied and broadly described, the improved device can include a main body for fitting various operative components, the main body defining a channel configured to receive a battery. A battery swapping mechanism can also be joined to the main body. The battery swapping mechanism can include an element such as a lever, pivotably mounted to the main body, having metallic pins, one of which is square and another of which is triangular. These pins can be located at a pre-calculated distance from each other. Optionally, the triangular pin can be located just below the square pin thereby preventing movement of the old battery until the new battery takes the position of the old one. The pins are interconnected to each other by the lever in such a fashion that the both pins will actuate when either of them is pushed. Also included is a battery having at least a positive and a negative metallic strip and detachably fitted to the main body for supplying power to the said device. The battery can be machined by an end milling process to provide at least three recesses for receiving the square pin and triangular pin simultaneously, and a lock plug. Two recesses are located adjacent to one another, i.e., one recess is located just above to the other. The recess configured to receive the metallic square pin i smaller in its breadth than the recess configured to receive the square pin and triangular pin simultaneously. The third recess can receive the lock plug in the normal position of the battery on the device. The slot meant to simultaneously receive the square pin and triangular pin is milled 45° with respect to the plane of the battery. The device can further include at least four terminal switches and out of the four, the upper two terminal switches accept the positive terminal of the battery and the lower two terminal switches accept the negative terminal of the battery. Lastly, the device can include a receptacle in a predetermined place, suitably machined, preferably milled, meant for a SIM card, and located just beside the four terminal switches between the battery and the body of the device.

These and other objects, advantages and features of the invention will be more readily understood and appreciated by reference to the detailed description of the drawings.

BRIEF DESCRIPTION OF THE DRAWINGS

The invention is described in the following in greater detail by way of an example with reference to the accompanying drawings in which:

FIG. 1A depicts inserting the battery into a recess in the casing of the phone according to the related art;

FIG. 1B shows a cross section view of the casing, III-III, from FIG. 1C according to the related art;

FIG. 1C shows a bottom view of the casing of a mobile phone with the recess according to the related art;

DETAILED DESCRIPTION OF THE DRAWINGS

Figure 1D:
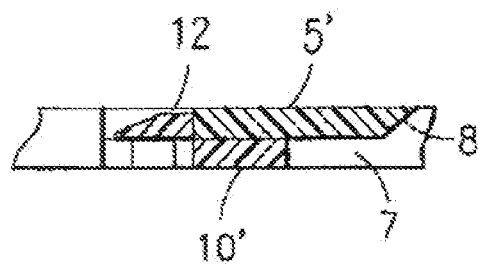
FIG. 1D shows a locking mechanism between the catch incorporated in the recess and the locking element belonging to the battery according to the related art.
Figure 2:
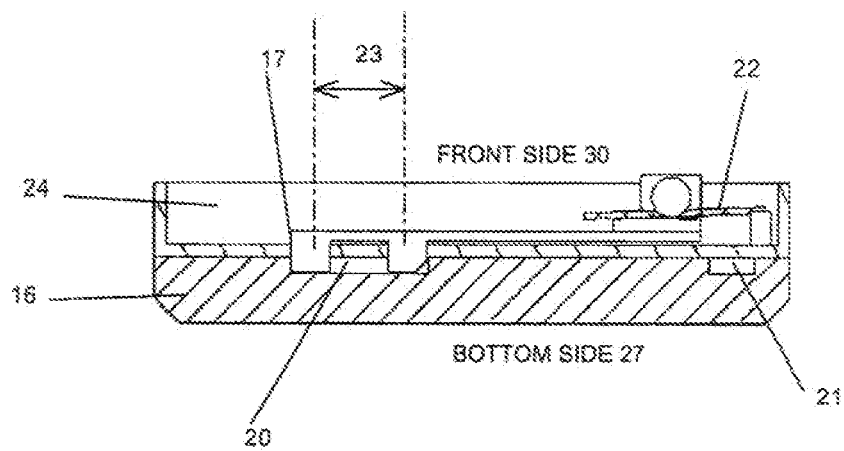
FIG. 2 shows an embodiment of the improved PDA device/PC with hand phone/mobile phone engaged with the battery pack under normal condition according to the present invention.
Figure 3:
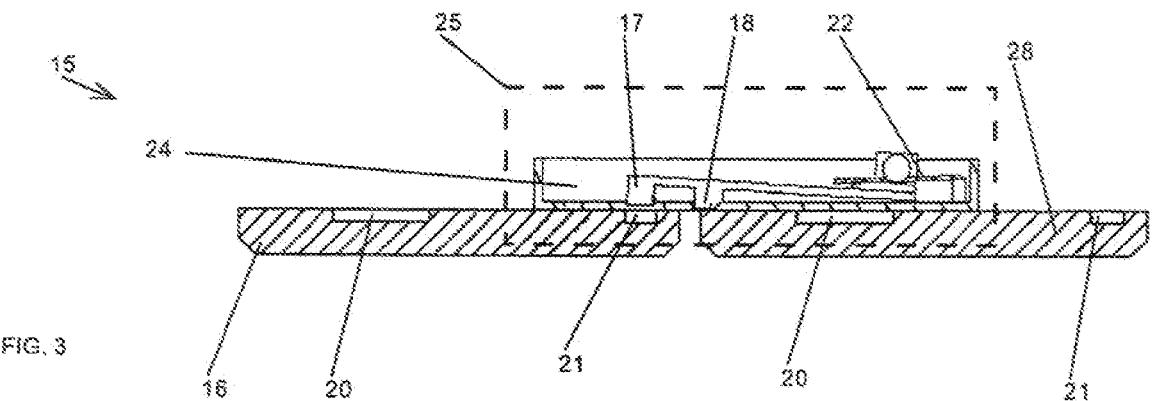
FIG. 3 depicts the improved PDA device/PC with hand phone/mobile phone when one new battery pushes the old battery without shutting down the said device according to the present invention.
Figure 4:
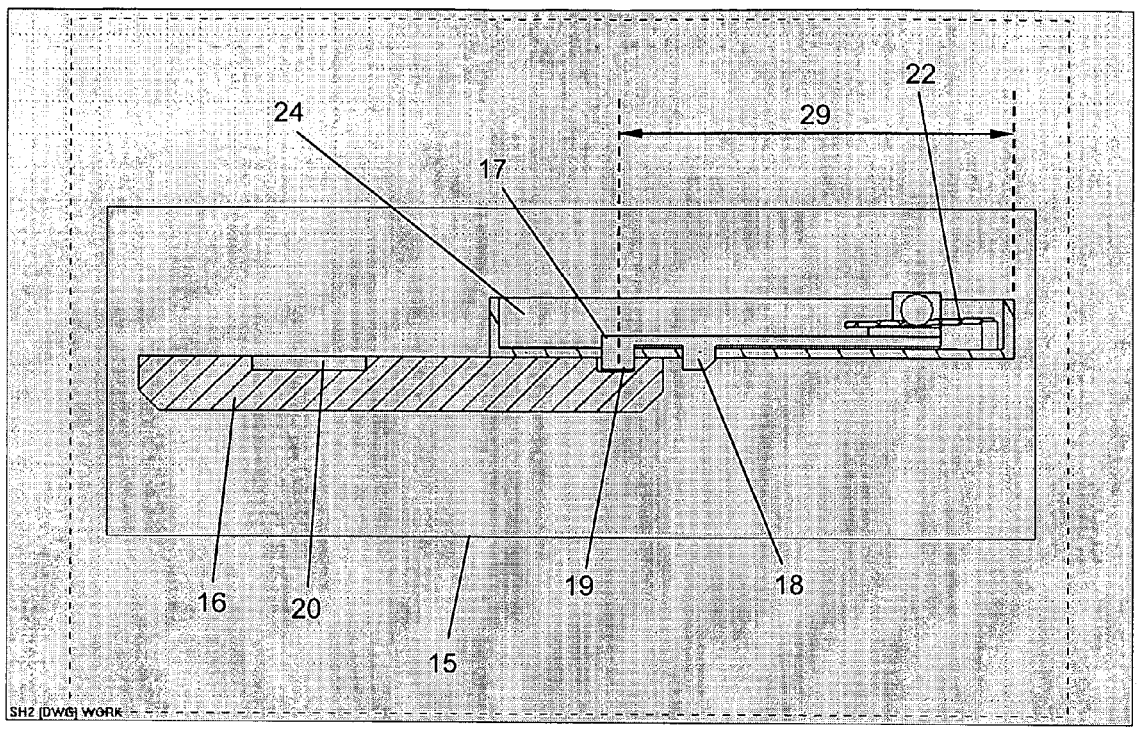
FIG. 4 illustrates the engagement of the pins of the said device during halfway movement of the old battery when the new battery pushes the old one according to the present invention.
Figure 5:
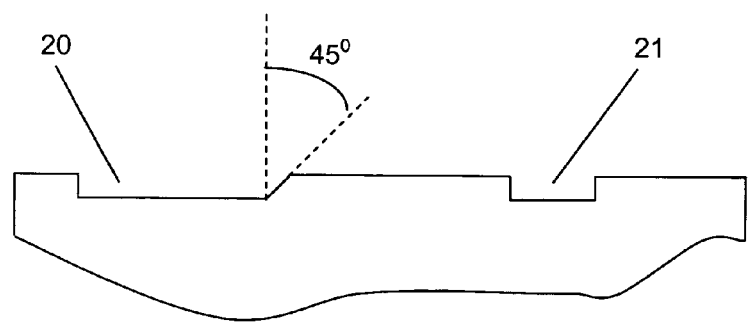
FIG. 5 illustrates plane of the battery slot makes 45° with respect to the plane of the said battery.
Figure 6:
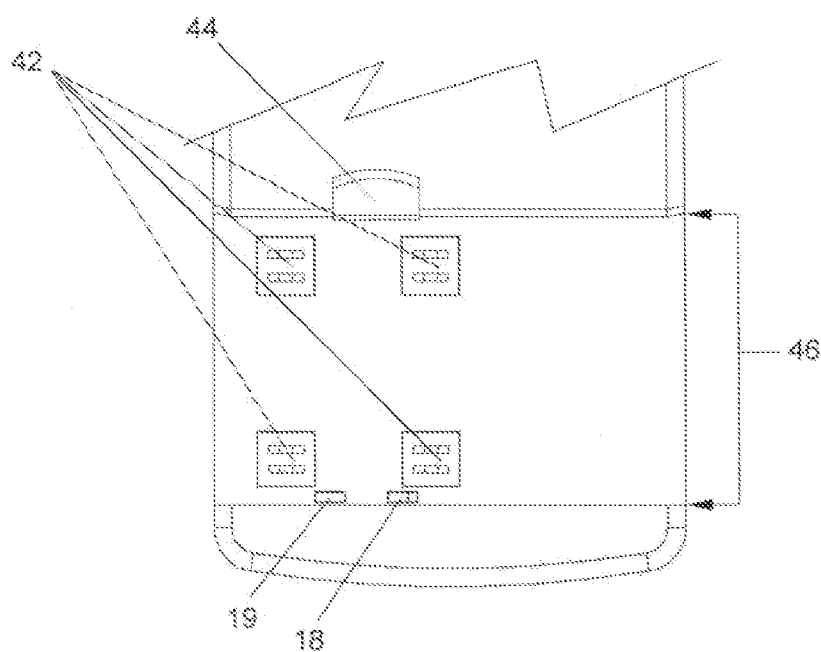
FIG. 6 shows a channel of the device for receiving the battery.
Figure 7:
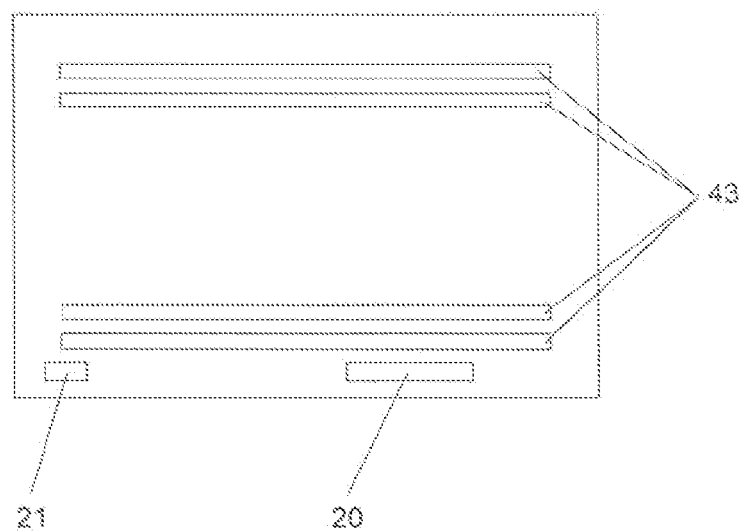
FIG. 7 shows an underside of the battery compatible with the device of the present invention.
Figure 8:
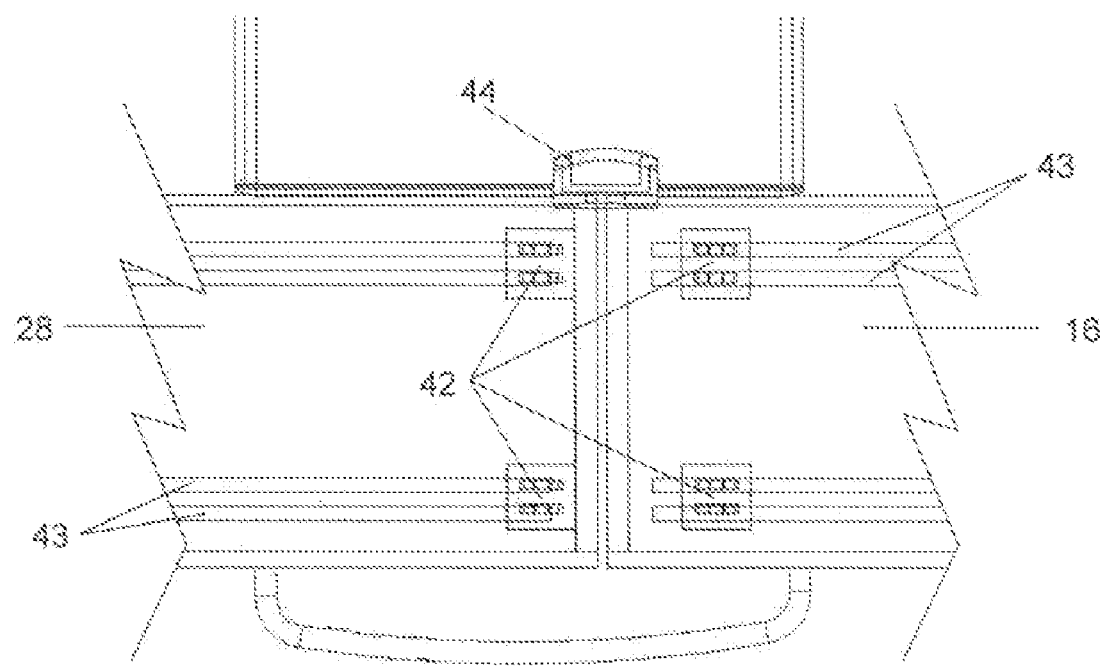
FIG. 8 shows an old battery being swapped with a new battery while maintaining contact between terminals of the batteries and terminals of the device to provide uninterrupted power to the device.

According to the present invention, the improved PDA device/pocket PC with hand phone/mobile phone 15 has a main body 24 for fitting various operative components.

The device 15 includes a battery swapping mechanism 25; a battery 16 suitably designed for the battery swapping mechanism 25 of the device 15; at least four terminal switches 42 for transferring power from the battery 16 to the device 15; a suitably machined, preferably milled receptacle (not shown) configured to receive a SIM card; a SIM card and a digital camera movably rotatable 180° with respect to its horizontal axis of rotation.

The battery swapping mechanism 25 includes at least a lever mechanism 17 having metallic pins of which one is square 19 and another is triangular 18. The square pin 19 and triangular pin 18 are separated by a pre-calculated distance 23. The other triangular pin 18 is located just below the square one 19. The pins are interconnected to each other by spring 22 loaded lever mechanism 17 in such a fashion that both the pins 18, 19 will be actuated when either of them is pushed. The pins are made of suitable metals/alloys having adequate strength.

The battery pack 16 has at least a positive and a negative metallic strip 43, and the battery pack 16 is detachably fitted to the main body for supplying power to the device 15. The battery 16 is machined by an end milling process to provide at least three recesses. Out of these three recesses, two recesses are located at same place but on different plane, i.e., one slot 20 is located just above to the other 21. The lowermost recess 21 is small in its breadth. Out of these two recesses 20, 21 the upper recess 20 receives both the square pin 19 and the triangular pin 18 simultaneously while the lower recess 21 receives the square pin 19 only. The lock plug 44 locks the battery 16 in position when the triangular pin 18 and square pin 19 engage the upper recess 20 in the battery 16 under normal conditions. The third recess 26 of the battery is preferably located away from these two slots 20, 21. The said third slot 26 receives the said metallic triangular pin 18 in normal position of the battery on the said device 15. The slot meant for triangular pin/lifer 18 is milled in such a fashion that the plane of the said slot makes 45° angles with respect to the plane of the said battery 16. The said non-metallic lock plug is used to unlock the said battery 16 during its replacement with a new one.

There are at least four terminal switches 42 built into a channel 46 on the rear side 27 of the body of the device 15. Two upper two switches 42 receives the positive metallic strip(s) 43 of the battery 16, and the lower two terminal switches 42 receive the negative metallic strip(s) 43 of the battery 16. During replacement of an old battery 16 with the a new one 28, at least two terminal switches 42 remain in contact with the metallic strip(s) 43 of the battery 16. This results in uninterrupted power flow to the device 15.

A SIM card for establishing communication with the service provider of the device 15 is located just beside the four terminal switches. The SIM card is installed between the said battery pack 16 and the said body of the said device. The place for the SIM card is suitably machined, preferably milled.

A small digital camera is fitted to the device. The function of the said camera fitted on the top right corner of the said device 15 is to take pictures as images the user desires. The said camera is movably rotatable 180° with respect to its horizontal axis.

The battery swapping mechanism 25 allows sliding an old battery 16 in a direction towards the square pin 19 approximately half way 29 of the width of the device 15, maintaining contact with one pair of terminal switches 42. In this position, the old battery 16 conceals two terminal switches 42 located at the outward part of the battery 16. More precisely, the terminal switches 42 are located just below the position of the square pin 19, and only the remaining two terminal switches 42 are visible from the inward side of the battery 16. Two terminal switches 42 remain in contact with the metallic strip 43 of the battery 16 during the sliding of the old battery 16.

As long as the metallic strip 43 of a battery remains in contact with positive and negative terminal switch 42, power flow from the old battery 16, 28 to the improved device 15 will be uninterrupted. The new battery 28 will replace the old battery 16 by actuating the triangular pin 18. When the triangular pin 18 is pushed upward by the new battery 28, a lever mechanism 17 located inside the case of the device 15 actuates the square pin 19. The triangular pin 18 located below the square pin 19 moves in upward direction thereby releasing the square pin 19 from a recess 21 of the battery 16. The old battery 16 can then move smoothly over the channel 46. The battery swapping mechanism 25 allows only one-way movement for both the old battery 16 and new batteries 28, i.e., in a direction towards the square pin 19 leaving behind the triangular pin 18.

It is to be understood, however, that although the characteristics and advantages of the present invention have been set forth in the foregoing description, the disclosure is illustrative only, and changes may be made in the arrangement of the parts within the scope of the appended claims.

The above description is of the preferred embodiment. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The invention claimed is:

1. A mobile PDA or pocket PC comprising:
    a main body defining a channel and including at least one terminal switch positioned in the channel;
    a battery swapping mechanism include a lever pivotably mounted to said main body, the lever including a first pin being substantially square and a second pin including an angled face; and
    a first battery and a second battery selectively and slidably positionable in the channel, each of the batteries including at least one battery terminal, each of the batteries defining a first recess adapted to receive the first pin and the second pin and to lock at least one of the first and second batteries in the channel, each of the batteries defining a second recess adapted to receive the first pin but not the second pin, wherein the first battery is displaceable by the second battery so that at least one battery terminal of at least one of the first battery and second battery remain in contact with the at least one terminal switch to provide continuous power from the battery to the device as the old battery is swapped with the new battery.

2. The device of claim 1, wherein the said main body further includes a moveable lock plug that engages at least one of the first battery and the second battery to lock the at least one of the first battery and second battery in the channel.

3. The device of claim 2, wherein the said lock plug is non-metallic.

4. The device of claim 1, wherein the said first pin and said second pin are metallic.

5. The device of claim 1, wherein the first recess includes an angled face that engages the angled face of the second pin so as to urge the first and second pins out from the first recess as the first battery is displayed by a user.

6. The device of claim 1, wherein the first pin engages the second recess of the first battery as the first battery is displaced by a user, the first pin engaging the second recess to prevent further displacement of the first battery until the second battery engages the second pin.

7. The device of claim 1, wherein the said first pin of the battery swapping mechanism engages the second recess of the first battery to interrupt displacement of the first battery so that at least one of the first battery and second battery provide power from the battery terminals to the terminal switches.

8. A method of replacing a battery of at least one of a mobile PDA, a pocket PC, and a cellular phone, comprising:
    providing a housing including an operative component, a plurality of terminal switches coupled to the operation component, and a movable element having a first pin and a second pin projecting therefrom;
    providing an old battery including an old battery terminal adapted to transfer power to at least one of the plurality of terminal switches, the old battery defining a first recess and a second recess, the first pin and the second pin disposed at least partially in the first recess;
    moving the old battery so that the first pin engages the first recess to urge the first pin and the second pin out from the first recess;
    continuing to move the old battery until the second pin engages the second recess to arrest movement of the old battery;
    engaging the first pin with a new battery so that the second pin disengages the second recess, the new battery including a new battery terminal adapted to transfer power to at least one of the plurality of terminal switches, the new battery defining a third recess and a fourth recess; and moving the new battery so that the lever urges the first pin and second pin into the third recess to arrest movement of the new battery, wherein at least one of the old battery terminal and the new battery terminal transfer power to at least one of the plurality of terminal switches throughout the above steps, whereby the operative component is provided with uninterrupted power during swapping of the old battery with the new battery.

9. The process of claim 8 wherein the first pin includes an angled face that engages the first recess to urge the first pin and the second pin out from the first recess.

10. The process of claim 8 wherein the new battery pushes the old battery during said engaging step.

11. The process of claim 8 wherein the housing includes a lock plug that engages the old battery to secure the old battery in a position.

12. The process of claim 11 comprising moving the lock plug to disengage the old battery so that the old battery is moveable.

13. The process of claim 8 comprising rotating the element so that the first and second pin disengage the first recess.

14. The process of claim 8 wherein the moving the old battery step includes sliding the old battery in a channel defined by the housing.

15. The process of claim 8 wherein the moving the new battery step includes sliding the new battery in a channel defined by the housing.

16. A device being at lest one of a mobile PDA, a pocket PC, and a cellular phone, the device comprising:
  a main body that houses an operative component, the operative component coupled to at least one terminal switch;
  at least one of an old battery and a new battery operably coupled to the main body at a position, each of the old battery and the new battery including at least one battery terminal adapted to transfer power to the at least one terminal switch, each of the old battery and the new battery each defining a first recess and a second recess; and
  a battery swapping mechanism joined with the main body and adapted to maintain continuous transfer of power from the at least one battery terminal to the at least one terminal switch as a user swaps the old battery with the new battery, the battery swapping mechanism including an element including a first pin that is separated from a second pin by a distance, the first pin including an angled face adapted to engage the first slot and facilitate removal of at least the first pin from the first slot, the second pin configured to engage the second slot and prevent movement of the old battery relative to the main body until a user slides the old battery out of the position with the new battery,
  wherein the first pin and second pin are joined with the element so that when the user engages the first pin with the new battery, the lever removes the second pin from the second slot of the old battery, thereby enabling the old battery to be removed by the user from the position, and subsequently enabling the first pin and second pin to engage the first slot to the new battery, whereby the new battery is secured to the main body at the position, all while maintaining continuous uninterrupted power to the operative component via at least one of the old battery and the new battery.

17. The device of claim 16 wherein the second pin is substantially square and metallic.

18. The device of claim 16 wherein the main body defines a channel and the terminal switch projects at least partially into the channel.

19. The device of claim 18 wherein the element is a lever joined with a spring that urges the lever toward the channel.

* * * * *